United States Patent
Akahoshi et al.

(10) Patent No.: US 8,385,175 B2
(45) Date of Patent: Feb. 26, 2013

(54) RECORDING AND REPRODUCTION APPARATUS AND METHOD FOR MONITORING AND MANAGING LASER POWER CALIBRATION AREAS IN A MULTI-LAYER RECORDING MEDIUM

(75) Inventors: Kenji Akahoshi, Yokohama (JP); Atsushi Fuchiwaki, Yokohama (JP)

(73) Assignees: Hitachi-LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 37 days.

(21) Appl. No.: 12/695,753

(22) Filed: Jan. 28, 2010

(65) Prior Publication Data

US 2011/0002205 A1  Jan. 6, 2011

(30) Foreign Application Priority Data

Jul. 6, 2009  (JP) ................. 2009-159415

(51) Int. Cl.
  *G11B 7/0045*  (2006.01)
(52) U.S. Cl. ............... 369/59.25; 369/47.53
(58) Field of Classification Search .......... None
  See application file for complete search history.

(56) References Cited

U.S. PATENT DOCUMENTS

| | | | |
|---|---|---|---|
| 7,483,349 B2 * | 1/2009 | Park et al. ............ | 369/47.14 |
| 2004/0264317 A1 * | 12/2004 | Lee ....................... | 369/47.5 |
| 2005/0117463 A1 | 6/2005 | Sasaki | |
| 2006/0083141 A1 | 4/2006 | Teranishi et al. | |
| 2007/0025210 A1 * | 2/2007 | Kishigami et al. ...... | 369/47.53 |
| 2008/0181072 A1 | 7/2008 | Lee et al. | |
| 2010/0329095 A1 * | 12/2010 | Kuwahara et al. ...... | 369/53.44 |

FOREIGN PATENT DOCUMENTS

| | | |
|---|---|---|
| CN | 1624774 A | 6/2008 |
| JP | 2006-147117 | 6/2006 |
| JP | 2006-344375 | 12/2006 |
| WO | WO 2009119019 A1 * | 10/2009 |

OTHER PUBLICATIONS

Ecma International, Standard ECMA-359 1st Edition/Dec. 2004, 80 mm (1.46 Gbytes per side) and 120 mm (4.70 Gbytes per side) DVD-Recordable Disk (DVD-R).

Office Action from China Intellectual Property Office for application CN201010108299.4 (Jan. 6, 2012).

* cited by examiner

*Primary Examiner* — Hoa T Nguyen
*Assistant Examiner* — Mark Fischer
(74) *Attorney, Agent, or Firm* — Kilpatrick Townsend & Stockton LLP

(57) ABSTRACT

Medium recording and reproduction apparatus and method can prevent prohibition of disc recording due to the fact that laser power calibration area becomes unusable by studying a management information update method during data recording. When usable capacity of the laser power calibration area is monitored and the capacity is reduced, management information area to be currently updated is changed to another layer.

4 Claims, 5 Drawing Sheets

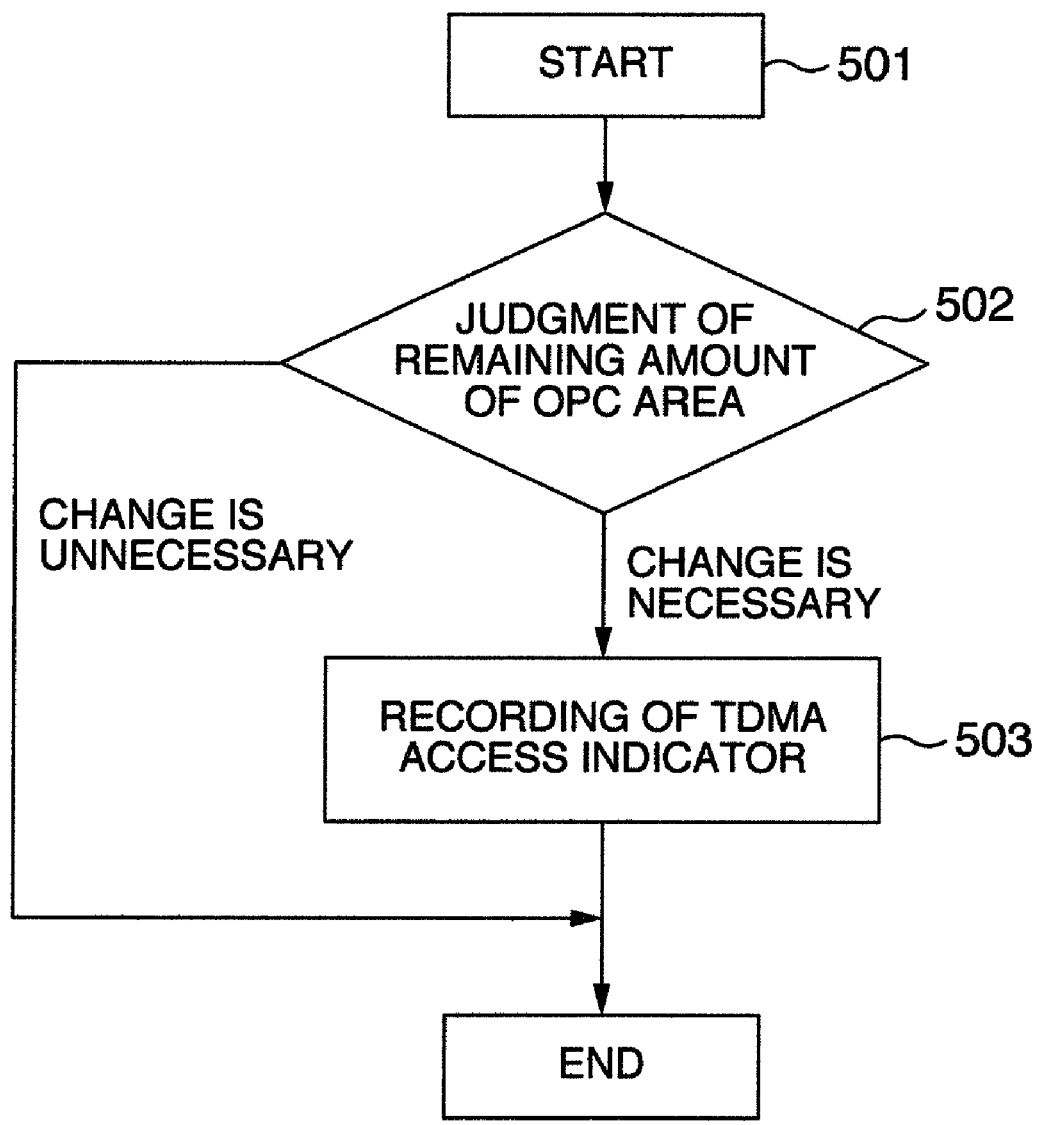

RECORDING AND REPRODUCTION APPARATUS AND METHOD FOR MONITORING AND MANAGING LASER POWER CALIBRATION AREAS IN A MULTI-LAYER RECORDING MEDIUM

BACKGROUND OF THE INVENTION

The present invention relates to medium recording and reproduction apparatus and method, and more particularly to regulations for treating a management information updating method in an apparatus for performing recording and reproduction while adjusting laser power for a medium and updating management information thereof.

Recently, there is a recording and reproduction apparatus in which a semiconductor laser is used to irradiate an optical disc recording medium represented by CD-R/RW (compact disc recordable/rewritable), DVD±R/RW (digital versatile disc±recordable/rewritable disc), DVD-RAM (digital versatile disc-random access memory), Blu-ray Disc (hereinafter abbreviated to BD) and the like with laser light so that data is recorded in the recording medium. In these optical disc apparatuses, laser light emitted from the semiconductor laser is focused on a recording plane of the optical disc to change the physical property of the recording plane, so that recording marks having different reflection factors are formed in the recording plane to record data.

These optical discs are supplied from a plurality of makers or manufacturers and since the recording sensitivity of the recording plane is different in each maker, the recording characteristic is scattered. Furthermore, since the recording characteristic is also dependent on the ambient temperature, it is widely different dependent on the recording situation. Accordingly, even if the whole area of the recording plane is irradiated with the laser light having the fixed intensity, it is not always the optimum irradiation intensity.

Accordingly, calibration for setting the irradiation intensity of laser light optimum (OPC: optimum power calibration) is performed to improve the recording quality before start of recording. For example, in case of DVD-R, a power calibration area is provided in an inner peripheral area of the disc (refer to Standard ECMA-359, $1^{st}$ Edition/December 2004, 80 mm (1.46 Gbytes per side) and 120 mm (4.70 Gbytes per side) DVD Recordable Disk (DVD-R)). The optical disc apparatus performs tentative recording and reproduction using predetermined pattern data in the power calibration area before data is recorded in a user data recording area and calculates the optimum laser power irradiation intensity to the optical disc on the basis of the result of the tentative recording.

Moreover, the recording state of the optical disc is stored in a management information storage area provided in the disc. For example, DVD-R has the management area named RMD area. The management information is additionally recorded therein when data is recorded in the user data area at necessary timing such as during recording of data, upon change of disc structure, upon execution of the optimum power calibration (OPC) and the like. This is described in JP-A-2006-147117 (US 2006/0083141).

A temporary defect management area (TDMA) of BD-R (Blu-ray disc recordable) corresponds to the RMD area of DVD-R and the TDMA is also updated (information is additionally recorded therein) even upon update of spare data recording information in defect management during recording in addition to the above update timing. The TMDA is provided in each recording layer and is used in order of the number assigned thereto in the standards. Further, the defect management method using TDMA is described in JP-A-2006-344375 (US 2008/0181072).

SUMMARY OF THE INVENTION

The laser power calibration processing (hereinafter referred to as OPC processing) is required to ensure the recording quality to the disc medium. The OPC processing is requisite for at least the layer to which recording is performed in the disc medium having a plurality of layers. (It is considered that recording can be performed even if the OPC processing is not performed, although the recording quality is not guaranteed) Furthermore, the OPC processing is required to be performed even when the recording circumstances are changed (insertion of disc after extraction thereof, change in temperature and the like). That is, the OPC processing to the recording layer in which the management information updated during data recording is stored is requisite. The case where the layer in which data is recorded and the layer in which the management information area to be additionally recorded is provided are different is now considered.

For example, it is supposed that, in a disc medium having 3 layers L0, L1 and L2, the user data recording area and the management information area are provided in each of the layers L0, L1 and L2. There is considered the case where data is first recorded in the user data recording area of the layer L0, so that the management information area of the layer L0 becomes wholly unusable while data is recorded in the user data recording area of the layer L0. It is assumed that the management information area of the layer L1 is used when the management information area of the layer L0 has been used to the fullest. Furthermore, it is supposed that data to be recorded in the user data recording area of the layer L0 is left and data is not yet or is not almost recorded in the user data recording area of the layer L1. When the recording is continued from this state, the OPC processing is performed to the layer L0 having the user data recording area and the layer L1 having the management information area. That is, the OPC processing is requisite for the layer L1 for recording of the management information area of the layer L1 though the user data recording area of the layer L1 is not recorded. When this processing is continued, the management information is recorded in the management information area of the layer L1 in the state that data is not almost recorded in the user data recording area of the layer L1. Accordingly, when the OPC processing is performed continuously, there is considered the case where when the user data is desired to be recorded in the layer L1, the OPC area of the layer L1 has been used to the fullest so that the OPC processing to the layer L1 cannot be performed. When it is considered that the OPC processing is requisite for maintaining the optimum recording quality, the possibility that recording to the disc cannot be performed wholly since the OPC processing to the layer L1 cannot be performed is also considered.

Accordingly, it is an object of the present invention to prevent prohibition of disc recording due to the fact that the OPC area becomes unusable by studying TDMA updating method in the above case.

The above object can be achieved by the inventions described in the Claims by way of example.

According to the present invention, the proper recording operation can be realized and the user's convenience can be improved.

Other objects, features and advantages of the invention will become apparent from the following description of the embodiments of the invention taken in conjunction with the accompanying drawings.

BRIEF DESCRIPTION OF THE DRAWINGS

FIG. 5 is a flow chart showing operation of the recording and reproduction apparatus according to the embodiment of the present invention.

DETAILED DESCRIPTION OF THE EMBODIMENTS

Embodiments of the present invention are now described with reference to the accompanying drawings.

Embodiment 1

Figure 1:
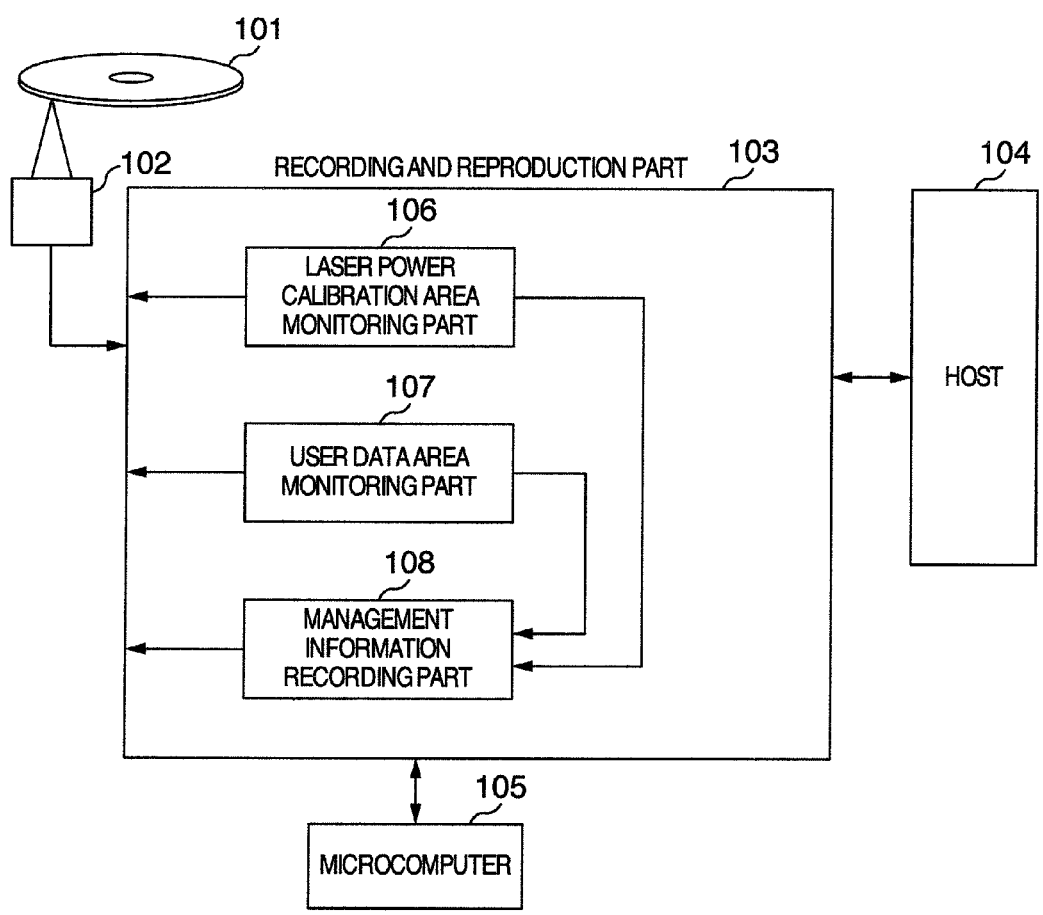
FIG. 1 is a block diagram schematically illustrating a recording and reproduction apparatus according to an embodiment of the present invention.

FIG. 1 is a block diagram schematically illustrating a recording and reproduction apparatus according to an embodiment of the present invention.

In FIG. 1, numeral 101 denotes an optical disc having a spare area and a management information storage area recorded therein and capable of recording and reproducing data, 102 a pickup for reading out recorded signal from the optical disc 101, 103 a data recording and reproduction part, which includes, although not shown, all means such as servo control means for controlling the pickup 102, means for modulating and demodulating data, means for correcting error, a temporary memory in which data is stored temporarily, temporary memory control means for controlling the temporary memory and I/F means represented by AT attachment packet interface (ATAPI) and for exchanging data with a host 104 in accordance with the protocol, which are required to supply data read out by the pickup to the host 104 which is an external apparatus and record data from the host 104 into the disc. Numeral 105 denotes a microcomputer for controlling the data recording and reproduction part, 106 a laser power calibration area monitoring part capable of monitoring the remaining usable capacity or occupied capacity of a laser power calibration area provided in the optical disc 101, 107 a user data recording area monitoring part capable of monitoring the remaining usable capacity or occupied capacity of a user data recording area provided in the optical disc 101, and 108 a management information recording part for recording management information into a management information area provided in the optical disc 101.

Figure 2:
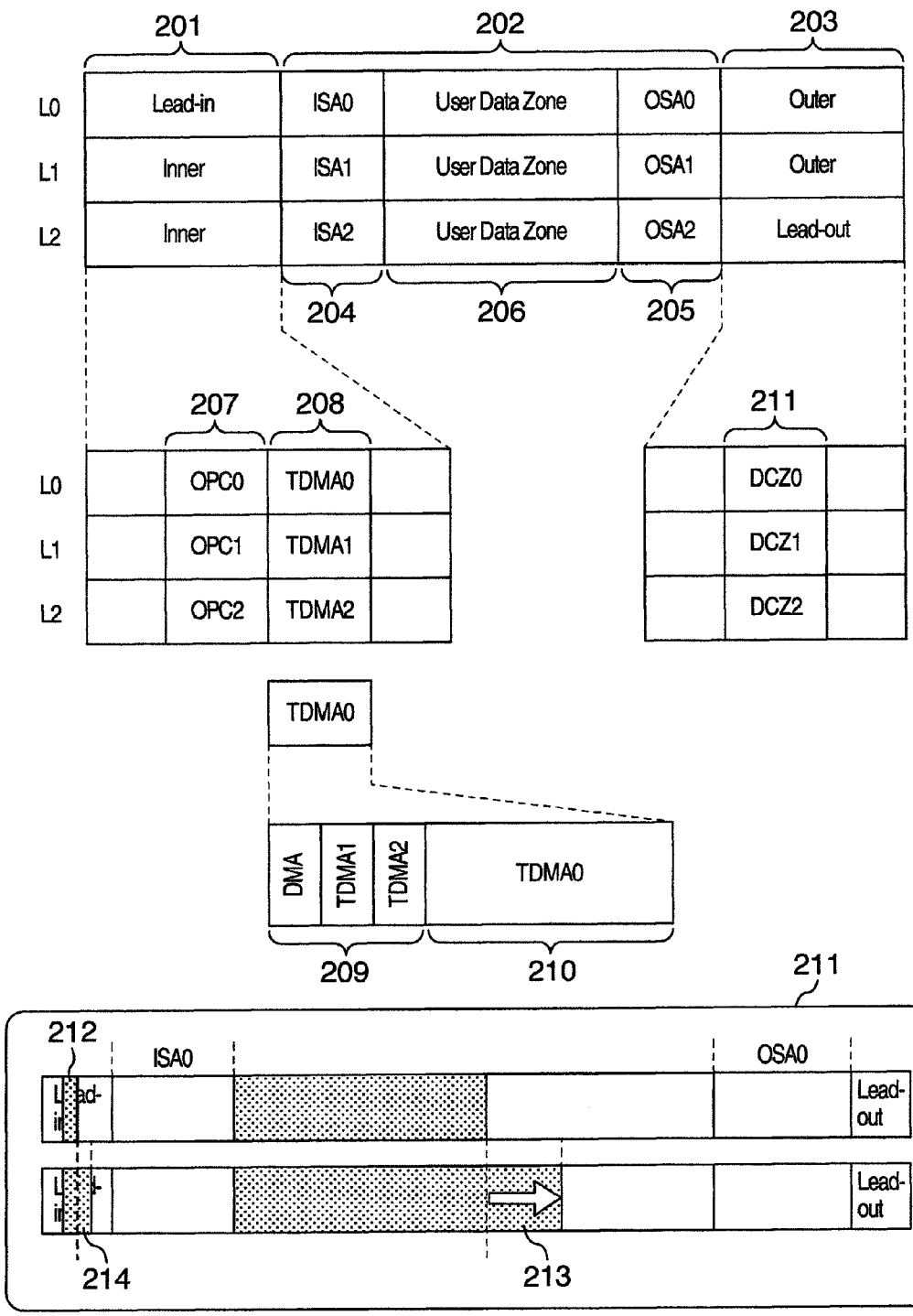
FIG. 2 illustrates a structure example of the whole disc of 3-layered BD-R.

FIG. 2 illustrates a structure example of the whole disc of 3-layered BD-R. The disc is divided broadly into three parts including inner peripheral area 201 containing Lead-in area and Inner areas, outer peripheral area 203 containing Lead-out area and Outer areas and Data Zone area 202 disposed between the inner and outer peripheral areas.

The Data Zone area 202 can provide a spare area for defect management and includes ISA (inner spare area) areas 204 disposed in inner peripheral part and OSA (outer spare area) areas 205 disposed in outer peripheral part. Remaining part 206 is an area in which user data can be recorded actually. The inner peripheral area 201 is described additionally. Numeral 207 denotes OPC area, which is necessarily provided in each layer. In FIG. 2, the OPC areas in respective layers are simply shown to be positioned in the same radial position for simplification of description, although the OPC areas are generally disposed not to overlap each other in consideration of influence of transmitted light actually. In the embodiment, OPC0, OPC1 and OPC2 are provided from the top of layers L0 to L2. Numeral 211 denotes a laser power calibration area on the outer peripheral side, which is an area named DCZ (data calibration zone). DCZ0, DCZ1 and DCZ2 are provided from the top of the layers L0 to L2.

Numeral 208 denotes TDMA (temporary disc management area) in which management information of recorded state is recorded. The TDMA's are provided in the inner peripheral area 201, the ISA area 204 and the OSA 205 and are assigned numbers to be used in numerical order, although in the embodiment it is supposed that TDMA's are provided only in the inner peripheral area 201 for simplification of description and TDMA0, TDMA1 and TDMA2 are provided from the top of the layers L0 to L2. TDMA access indicator 209 is provided in the head of TDMA0 and is used to grasp which TDMA of TDMA0 to TDMA2 is used. For example, when TDMA0 is used, any information is not recorded in the TDMA access indicator and when TDMA1 is being used, data is recorded in TDMA1 of the TDMA access indicator 209. Similarly, when TDMA2 is being used, data is recorded in TDMA2 of the TDMA access indicator 209 and when the optical disc is finalized, data is recorded in DMA of the TDMA access indicator 209. The remainder 210 excluding the TDMA access indicator is TDMA0 in which actual management information is recorded. Furthermore, although not shown, TDMA includes TDFL (temporary defect list), SRRI (sequential recording range information) and TDDS (temporary disc definition structure). TDFL is mainly used as a list for managing spare data recording places for defect places on the disc. SRRI mainly contains management information about recording area corresponding to track of CD, named SRR (sequential recording range). Further, TDDS contains disposition information of TDFL and management information of disc such as capacity of ISA and OSA. That is, each time the spare data recording processing is performed, the disc structure is changed or data is recorded, it is necessary to record information in TDMA additionally. There are plural update opportunities of management information, although TDMA update accompanying LRA (last recorded address) update during data recording, which is one of them, is described supplementary.

SRRI in TDMA contains information indicating until which address of the medium data is recorded (=LRA). This information is used to find out a recording start address upon insertion of the medium quickly. When LRA is not updated periodically, LRA retrieval must be performed from the top of data upon insertion of medium, so that it takes time to search for the recording start address. Accordingly, it is necessary to update LRA in SRRI or record TDMA for each fixed amount of recorded data. It is supposed that TDMA is recorded in 212 in the state of the upper part of 211 in FIG. 2. It is supposed that recording of 213 is performed from this state to be changed into the state of the lower part of 211 in FIG. 2. If it is assumed that a recorded amount of data in 213 exceeds a recorded amount required to update TDMA, TDMA of 214 is recorded. In this manner, it is necessary to record TDMA periodically even during continuous recording. It is a matter of course that when TDMA is recorded, the laser power calibration for recording TDMA is required for the same layer if temperature is changed or if the laser power calibration is not performed.

Referring now to FIG. 3, update processing of the management information and OPC processing during data recording in an actual BD-R are described.

Figure 3A:
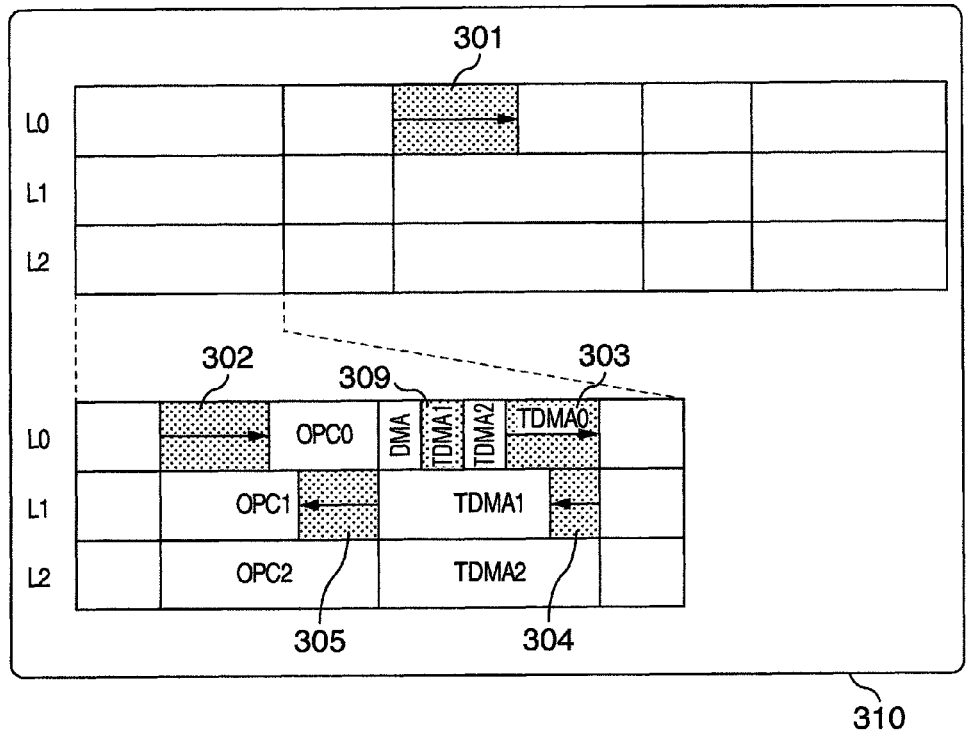
FIGS. 3A and 3B illustrate update of management information in data recording and OPC processing in an actual BD-R.
Figure 3B:
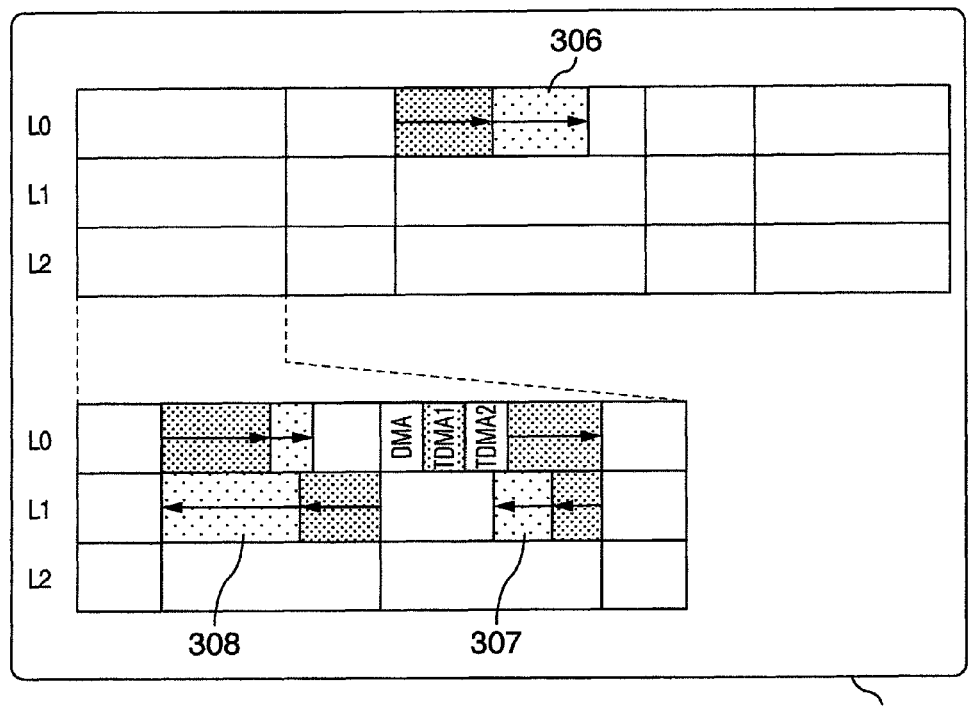

FIGS. 3A and 3B illustrate an example showing how data is recorded in each area actually when data is recorded in the disc having the disc structure described in FIG. 2. 310 of FIG. 3A shows how data is recorded in each area when user data is recorded as shown by 301. First, it is assumed that user data is recorded from user data area of layer L0, laser power calibration in OPC0 area is required before start of recording and accordingly OPC processing is performed at the place shown by 302. There is considered the case where user data is thereafter continued to be recorded and user data has been recorded in all area of TDMA0 due to the reason that the opportunity of additionally recording the management information is increased in order to reflect change in the disc structure or perform recording after the disc is extracted on the way and inserted again or all user data cannot be recorded due to defect.

In order to change the area to be updated into TDMA1 when TDMA0 becomes unusable, data is recorded in the area of TDMA1 (309) of the TDMA access indicator indicating that TDMA0 has been used to the fullest. Consequently, it can be shown that the newest TDMA to be additionally recorded is TDMA1.

In order to perform recording of 304 in TDMA1, it is necessary to perform OPC processing when OPC processing in layer L1 is not performed and it is supposed that OPC processing of 305 is performed. 311 of FIG. 3B shows how data is recorded in each area when data 306 is additionally recorded in layer L0 in the state of 310.

It is supposed that management information is required to be additionally recorded during recording of 306, so that 307 is recorded in TDMA1 of layer L1. There is a possibility that area of OPC1 is used to the fullest (recording of 308 in OPC1 area) depending on how to record data of 307 or the state of the recording and reproduction apparatus.

In this manner, when the layer in which user data is recorded and the layer in which management information to be updated (additionally recorded) is stored are different, there is a possibility that the laser power calibration area is used to the fullest though recording of data in the user data recording area which is the same layer as the management information area being updated is not almost performed. A solving measure for preventing this problem is described with reference to FIG. 4.

Figure 4A:
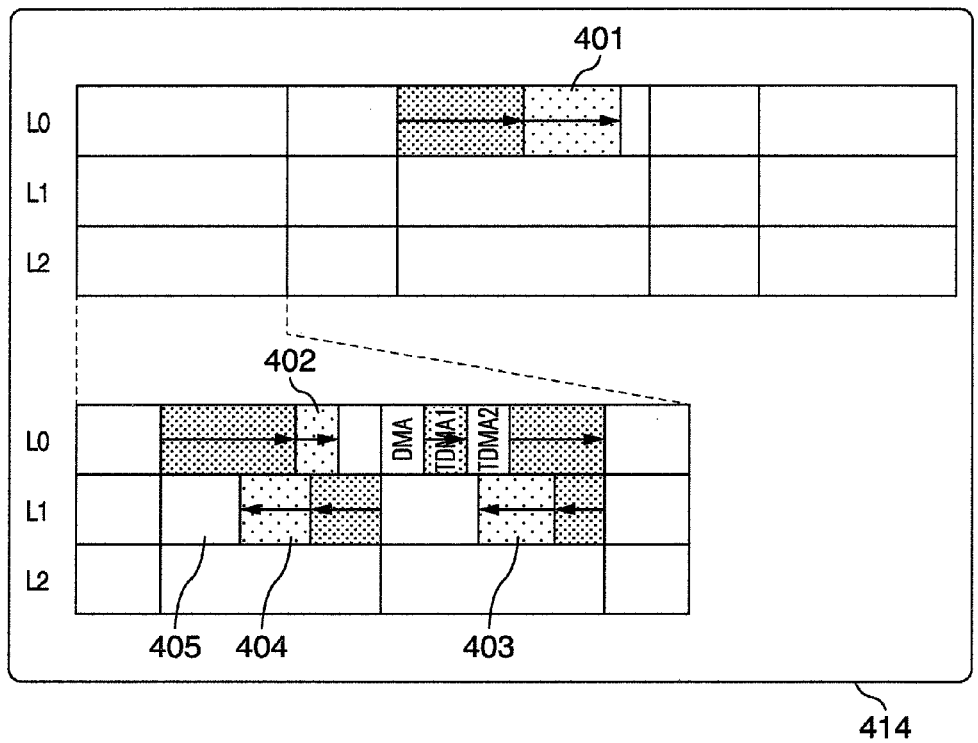
FIGS. 4A and 4B illustrate how data is recorded in each area.

414 of FIG. 4A shows how data is recorded in each area when data 401 is additionally recorded in layer L0 in the state of 310 of FIG. 3A. First, in order to perform the laser power calibration in OPC0 area before start of recording in layer L0, OPC processing is performed in the place shown by 402. Thereafter, it is supposed that management information is recorded in area of 403 in TDMA1 during recording of user data in 401 and 404 is recorded in OPC1 area. Here, attention is paid to remaining usable area 405 of OPC1. If the remaining area 405 does not have the capacity sufficient to record data in user data recording area of layer L1, there is a possibility that all area of OPC1 is used to the fullest during recording of user data recording area of layer L1, so that recording of data (recording of user data and recording to alternation area) in layer L1 cannot be performed.

Accordingly, when there is a possibility that data is still recorded in the user data recording area of layer L1, the OPC1 area must be ensured to some degree.

The realization method thereof is now described with reference to 415 of FIG. 4B.

Figure 4B:
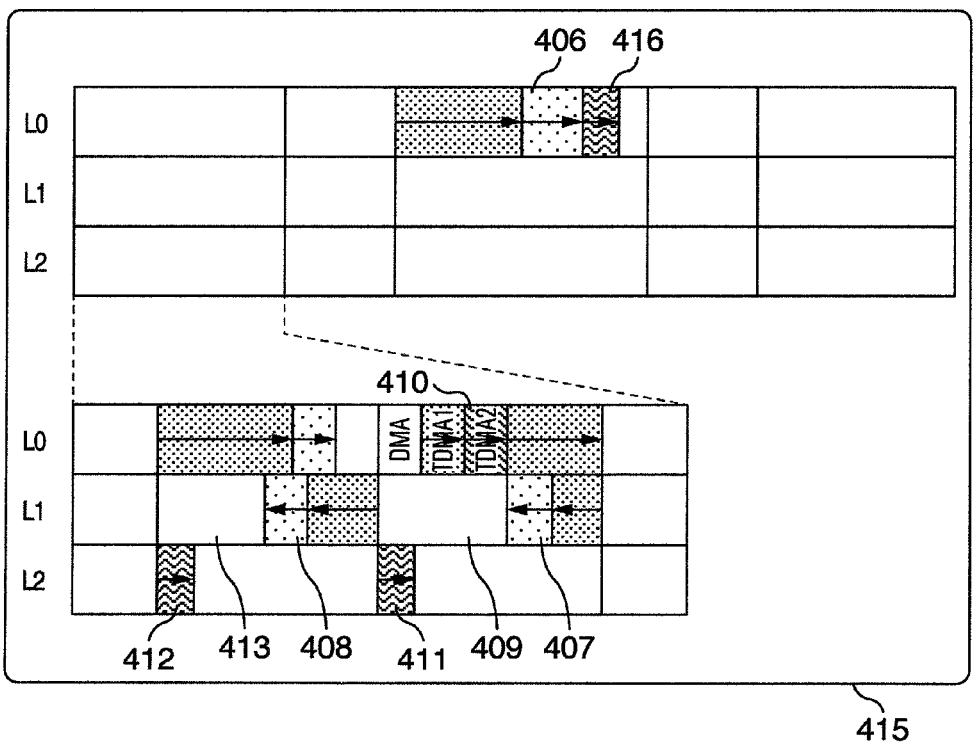

415 of FIG. 4B also shows how data is recorded in each area when data 406 and 416 are additionally recorded in layer L0 in the state of 310 of FIG. 3A.

After execution of OPC processing in OPC0 area, it is supposed that data is recorded in area of 407 in TDMA1 and data is recorded in area of 408 in OPC1 area during recording of user data of 406. When the remaining capacity of OPC1 at this time is equal to the previously defined condition (described later), recording is performed in TDMA2 (410) in TDMA access indicator. By recording in TDMA access indicator, there is still the remaining area 409 of TDMA1 and even in the recording state TDMA1 area can be set to be unusable and TDMA2 area can be changed to management information area to be next updated. In this way, even if recording 416 to user data area is performed, update of management information is performed to TDMA2 as shown by 411 and laser power calibration accompanying it is also performed in OPC2 area as shown by 412.

Accordingly, sufficient OPC area 413 required to record data in user data recording area of layer L1 can be ensured and recording of data in user data recording area of layer L1 can be performed. The previously defined condition is described. In the embodiment, some examples of the condition are described.

Condition Example 1 the case where the usable capacity of OPC1 area is lower than a previously defined value. This corresponds to the case where, for example, when OPC1 area has 1000 blocks, blocks in usable area is lower than 300 in number.

Condition Example 2 the case where usable capacity of OPC1 area is lower than a predetermined ratio of the whole capacity of OPC1 area. This corresponds to the case where, for example, when OPC1 area has 1000 blocks, the remaining capacity is lower than 30% in ratio. The condition 2 is different from the condition 1 in that the condition 1 is prescribed by concrete numerical value and the condition 2 is prescribed by percentage.

Condition Example 3 the case where a ratio A of remaining usable capacity to the whole capacity of user data recording area of layer L1 and a ratio B of remaining usable capacity to the whole capacity of OPC1 are compared with each other and the ratio A is larger than the ratio B (A>B). However, when user data recording area of layer L1 is not almost used, there is a possibility that the ratio A is always larger than the ratio B (A>B). Accordingly, in order to apply this condition, it is considered that restriction conditions are required to be added to this condition. That is, this condition is applied when usable capacity of layer L1 exceeds 50% or when remaining capacity of OPC1 is lower than a set value. Moreover, when user data recording area of layer L1 is all recorded or occupied, all OPC1 area in this layer can be used for recording of TDMA or spare area and accordingly even if the condition is satisfied, it may be neglected.

Condition Example 4 the case where recording state of OPC area in first layer adversely affects OPC processing result of OPC area in second layer. This is, for example, the case where OPC processing result in second layer is adversely affected by influence of laser area transmitting OPC area in first layer recorded slightly overpoweringly.

As understood from the above-described examples, there are a plurality of conditions of judging whether data can be recorded in user data recording area of layer L1 if how much remaining usable capacity of OPC1 area remains. Furthermore, since the conditions depend on frequency and opportunity of laser power calibration of the recording and reproduction apparatus, specification of the number of blocks to be used and update frequency of TDMA, the conditions are not narrowed down to one. Accordingly, if it can be realized that usable capacity of laser power calibration area is monitored and management information area to be updated currently is moved to another layer, the condition has no problem.

Finally, an example of a flow chart of the embodiment is described with reference to FIG. 5. Judgment processing as to whether area for management information is moved when OPC processing is ended during recording of user data or management information is started (step 501). In step 502, the remaining amount of OPC area is judged and whether change for moving the management area to another layer is required is judged on the basis of predetermined conditions. The judgment conditions are as described above. In step 502, it is judged that the change is required, the relevant TDMA access indicator is recorded in order to change the object to be updated to TDMA area of another layer. In step 502, it is judged that the change is not required, management information area being additionally recorded is used as it is.

As described above, according to the present invention, the usable capacity of the laser power calibration area is monitored to change the management information area to be currently updated to another layer, so that prohibition of disc recording due to the fact that the OPC area becomes unusable is prevented.

Complementary description of the embodiment is now made.

1. There is a possibility that the same thing occurs in the layer L2 (reduction of OPC2 area) when the method of the embodiment is repeated, although since the method is desirable as compared with the fact that recording becomes impossible early during recording of layer L1 and can prolong the life of disc certainly, the present invention is considered to be effective.

2. About TDMA in spare area. TDMA is ensured in each of ISA and OSA in the disc containing actual ISA and OSA as described above. That is, TDMA area is ensured in the same layer except TDMA0, 1, 2 of the embodiment and even after TDMA2 of the embodiment is used to the fullest, the management information is recorded additionally as TDMA3, 4, .... However, recording becomes impossible depending on usable capacity of OPC area and there is also a possibility that recording cannot be performed after TDMA3. In the embodiment, TDMA after TDMA3 is not considered, although even if there is TDMA after TDMA3, recording may be performed when it is recordable state and it may be treated as unrecordable when it is unrecordable. Accordingly, it is specifically no matter that the above problem is not considered in the embodiment.

3. About laser power calibration area on the outer peripheral side. In the embodiment, DCZ in the laser power area on the outer peripheral side is not described. This generally reflects that the recording and reproduction apparatus generally takes a serious view of the calibration result in the laser power area disposed in the inner peripheral side as compared with the outer peripheral side. In the embodiment, it is treated as unrecordable of data that laser power calibration is not performed on the inner peripheral side, although an apparatus which can perform recording only in DCZ on the outer peripheral side is naturally considered even if an area on the inner peripheral side is not used depending on a recording and reproduction apparatus. In this case, there is no problem if DCZ area on outer peripheral side is also considered in addition to OPC area on inner peripheral side in the embodiment. Accordingly, it is specifically no matter that DCZ is not considered in the embodiment.

4. About disposition of TDMA. In the embodiment, description has been made as TDMA being always provided in each layer, although even the case where TDMA cannot be disposed in each layer because of disposition restriction of TDMA is considered. In this case, the same consideration as the example that TDMA0 described in the embodiment is already used to the fullest is applicable.

5. In the embodiment, three layers have been described by way of example, although it is needless to say that the same effects can be attained even in multi-layered medium having three or more layers without limiting to three layers. The present invention can be applied to any medium as far as it has the concept of alternation area and management information storage area without limiting to the optical disc described in the embodiment and it is needless to say that the same effects can be attained.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A recording and reproduction apparatus which performs recording and reproduction of information in a recording medium including user data recording areas, laser power calibration areas, management information storage areas to which recording is performed when recording state is changed and a plurality of recording layers, each layer including a user data recording area, a laser power calibration area, and a management information storage area, comprising:

a laser power calibration area monitoring part to individually monitor a usable area of the laser power calibration area in each layer;

a user data recording area monitoring part to individually monitor a usable area of the user data recording area in each layer; and a management information recording part to record information in the management information storage areas, wherein the management information recording part being, when the management information storage area in a first recording layer is to be updated, responsive to an instruction from the laser power calibration area monitoring part, not to update the management information storage area in the first recording layer hereafter and to update the management information storage area in a second recording layer, wherein when the laser power calibration area in the first recording layer is used for recording of the user data recording area of a third recording layer and a usable capacity of the laser power calibration area in the first recording layer is lower than a predetermined threshold, the laser power calibration area monitoring part issues the instruction to the management information recording part, the laser power calibration area whose usable capacity is lower than the predetermined threshold being used for recording of the user data recording area of the first recording layer.

2. A recording and reproduction apparatus which performs recording and reproduction of information in a recording medium including user data recording areas, laser power calibration areas, management information storage areas to which recording is performed when recording state is changed and a plurality of recording layers, each layer including a user data recording area, a laser power calibration area, and a management information storage area, comprising:
- a laser power calibration area monitoring part to individually monitor a usable area of the laser power calibration area in each layer;
- a user data recording area monitoring part to individually monitor a usable area of the user data recording area in each layer; and
- a management information recording part to record information in the management information storage areas,
- wherein the management information recording part being, when the management information storage area in a first recording layer is to be updated, responsive to an instruction from the laser power calibration area monitoring part, not to update the management information storage area in the first recording layer hereafter and to update the management information storage area in a second recording layer, wherein when a usable capacity of the laser power calibration area in the first recording layer is lower than a predetermined threshold, the laser power calibration area monitoring part issues the instruction to the management information recording part; and
- wherein when a ratio B of a remaining capacity of the laser power calibration area to the whole capacity of the laser power calibration area in the first recording layer calculated by the laser power calibration area monitoring part is smaller than a ratio A of a remaining capacity of the user data recording area to the whole capacity of the user data recording area in the first recording layer calculated by the user data recording area monitoring part, the laser power calibration area monitoring part issues the instruction to the management information recording part.

3. A method of recording information in a recording medium including user data recording areas, laser power calibration areas, management information storage areas to which recording is performed when recording state is changed and a plurality of recording layers, each layer including a user data recording area, a laser power calibration area, and a management information storage area, comprising the steps of:
- updating the management information storage area in a first recording layer of the recording medium; and
- if a usable area of the laser power calibration area in the first recording layer satisfies a predetermined condition, not updating the management information storage area in the first recording layer and updating the management information storage area in a second recording layer;
- wherein the predetermined condition is that a usable capacity of the laser power calibration area in the first recording layer is lower than a predetermined threshold, and
- wherein when the laser power calibration area in the first recording layer is used for recording of the user data recording area of a third recording layer and a usable capacity of the laser power calibration area in the first recording layer is lower than a predetermined threshold, not updating the management information storage area in the first recording layer and updating the management information storage area in a second recording layer, the laser power calibration area whose usable capacity is lower than the predetermined threshold being used for recording of the user data recording area of the first recording layer.

4. The recording method according to claim 3, wherein when a ratio of a remaining capacity of the user data recording area to the whole capacity of the user data recording area in the first recording layer is A and a ratio of a remaining capacity of the laser power calibration area to the whole capacity of the laser power calibration area in the first recording layer is B, the predetermined condition is that the ratio B is smaller than the ratio A.

* * * * *